United States Patent
Motwani (10) Patent No.: US 9,438,287 B2
(45) Date of Patent: Sep. 6, 2016

(54) APPARATUS AND METHOD FOR MITIGATING LOSS OF SIGNAL CONTENT

(71) Applicant: INTEL CORPORATION, Santa Clara, CA (US)

(72) Inventor: Ravi H. Motwani, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/562,499

(22) Filed: Dec. 5, 2014

(65) Prior Publication Data
US 2016/0164556 A1    Jun. 9, 2016

(51) Int. Cl.
*H04B 1/10* (2006.01)
*H04B 1/04* (2006.01)
*H04L 25/08* (2006.01)

(52) U.S. Cl.
CPC .......... *H04B 1/1036* (2013.01); *H04B 1/0475* (2013.01); *H04B 2001/1063* (2013.01); *H04L 25/085* (2013.01)

(58) Field of Classification Search
CPC ............... H04B 1/0475; H04B 2001/1063; H04B 1/12; H04B 1/10; H04B 1/1036; H04L 25/085
See application file for complete search history.

(56) References Cited

U.S. PATENT DOCUMENTS

| | | | |
|---|---|---|---|
| 6,327,311 B1* | 12/2001 | Ojard | 375/261 |
| 6,553,087 B1 | 4/2003 | Alelyunas et al. | |
| 7,599,422 B2* | 10/2009 | Stojanovic et al. | 375/147 |
| 8,059,577 B2* | 11/2011 | Hottinen | 370/315 |
| 8,139,675 B2* | 3/2012 | Stojanovic et al. | 375/295 |
| 2002/0122562 A1 | 9/2002 | Brennan et al. | |
| 2009/0207896 A1* | 8/2009 | Behzad | 375/221 |
| 2010/0046600 A1 | 2/2010 | Zerbe et al. | |
| 2011/0275313 A1* | 11/2011 | Baldemair et al. | 455/17 |
| 2013/0177107 A1 | 7/2013 | Seo et al. | |
| 2015/0049880 A1 | 2/2015 | Villemoes et al. | |

FOREIGN PATENT DOCUMENTS

| | | |
|---|---|---|
| KR | 10-2012-0061026 A | 6/2012 |
| KR | 10-2014-0132341 A | 11/2014 |

OTHER PUBLICATIONS

International Search Report and Written Opinion for International Patent Application No. PCT/US2015/056103, mailed on Jan. 27, 2016.

* cited by examiner

*Primary Examiner* — Sophia Vlahos
(74) *Attorney, Agent, or Firm* — Green, Howard & Mughal, LLP (57) ABSTRACT

Described is an apparatus comprising: a first sampler to oversample a signal, the signal being processed for transmission through a channel having a notch region; a bandpass filter with passband response to filter the oversampled signal in the notch region; and a first modulator to translate the filtered signal to a higher frequency band than a frequency band of the notch region. Described is a method performed by a transmitter, the method comprising: oversampling a signal; and translating, in response to the oversampling, signal content in a notch region of a channel to a frequency band which is higher than a frequency band of the notch region.

24 Claims, 6 Drawing Sheets

APPARATUS AND METHOD FOR MITIGATING LOSS OF SIGNAL CONTENT

BACKGROUND

Sometimes a portion of signal contents transmitted/received at a high input/output transfer rate over a channel (or bus) between two integrated circuits are lost. In a frequency response for the channel, the lost signal contents, which are typically transmitted/received at the higher frequency of the channel frequency response, are identified by a region in which the frequency amplitude is about zero or is heavily attenuated. This region of the frequency response is typically referred to as a "notch" or "notch region". This notch may also result in inter symbol interference (ISI) in the signal.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

In some embodiments, signal processing methods are employed to ensure fidelity of a signal transmitted/received at a high input/output transfer rate over a channel (or bus) between two integrated circuits after loss of a portion of the signal contents represented by a notch (a region in which the frequency amplitude is about zero or is heavily attenuated) in the frequency response for the channel. In some embodiments, filter banks are used to ensure that the contents of the signal (which is oversampled) in a region of the channel notch are recoverable at the receiver. In some embodiments, pre-processing of the signal prior to transmitting over the channel is performed to move the signal contents, which would have been in the notch region, to a higher frequency band in the frequency response.

In some embodiments, post-processing of the received signal contents is performed by filtering the higher frequency band content and modulating it to a lower frequency band (i.e., the frequency band of the notch region). In some embodiments, the received content (that underwent the channel notch effect) is then combined with the modulated signal to generate a recovered signal. In some embodiments, the recovered signal is then down sampled to a frequency of the original signal (i.e., the frequency before that signal was oversampled at the transmitter end).

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical or wireless connection between the things that are connected, without any intermediary devices. The term "coupled" means either a direct electrical or wireless connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The terms "substantially," "close," "approximately," "near," and "about," generally refer to being within +/−20% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Figure 1A:
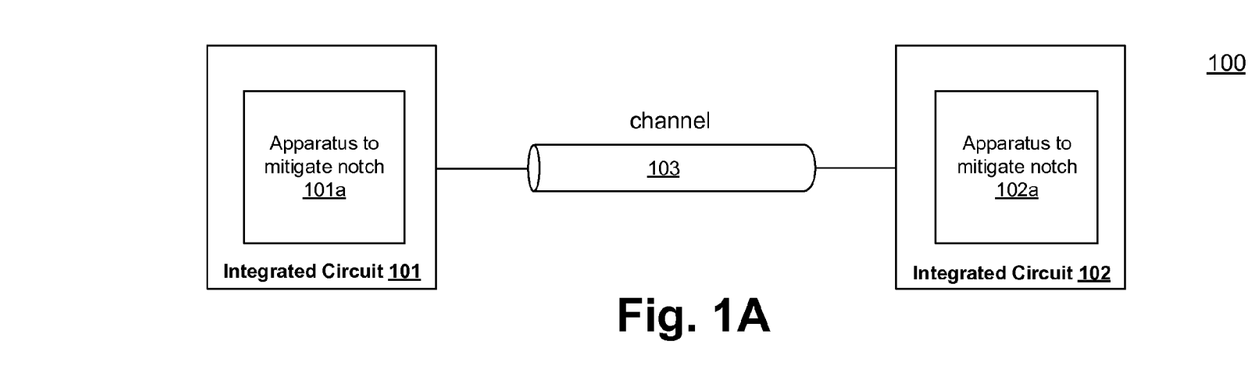
FIG. 1A illustrates a system having a channel exhibiting a notch in its frequency response, and apparatus for mitigating the notch effect, according to some embodiments of the disclosure.

FIG. 1A illustrates system 100 having a channel exhibiting a notch in its frequency response, and apparatus for mitigating the notch effect, according to some embodiments of the disclosure. Here, system 100 includes integrated circuits (ICs) 101 and 102 coupled together via channel 103. Channel 103 exhibits a notch in frequency domain. The term "notch" here generally refers to a characteristic of a channel having a region in the frequency domain where signal content is lost. The frequency location or region of the notch in the frequency domain for a channel may be known in advance as part of the channel characterization.

In some embodiments, each IC comprises apparatus 101a and 102a to mitigate the notch effect, respectively, so that the signal transmitted by a transmitter is recovered at the receiver with full fidelity. If a signal which is critically sampled is transmitted over a channel that has a frequency response which is not zero at any frequency, then an inverse filtering operation (or an ISI cancellation process) can be used to recover the signal at the receiver. But if the channel has a notch in the frequency domain which leads to virtual loss of the transmitted signal, without something more, that signal cannot be recovered with full fidelity. In some embodiments, the signal transmitted over the channel is pre-processed by apparatus 101a (assuming here, that IC 101 is transmitting a signal to IC 102 over channel 103) and then post-processed by apparatus 101b (i.e., the receiver end) so that the effect of the notch is mitigated.

In some embodiments, apparatus 101a has logic (e.g., samplers, filters, adders, modulators, etc.) that oversamples a signal (which is to be transmitted) so that a high frequency band is available. In some embodiments, the signal is a critically sampled signal. In some embodiments, the high frequency band is used to carry the signal content that would have been otherwise suppressed or lost as represented by the notch region in the frequency domain in channel 103. In some embodiments, apparatus 101a comprises a modulator that translates the oversampled signal in the notch region to the newly made available higher frequency band. A driver or transmitter then transmits the oversampled signal along with the oversampled signal in the notch region (which is now translated to a higher frequency band) to IC 102 over channel 103.

Channel 103 introduces a notch in a pre-known notch region of the channel and so the oversampled signal in the pre-known notch region is suppressed when the receiver receives the oversampled signal via channel 103. In some embodiments, the oversampled signal in the notch region, which is translated to the higher frequency band, is also received by the receiver in IC 102. Since the higher frequency band is away from the frequency band of the notch region, the signal content translated over to the higher frequency band retains fidelity. In some embodiments, apparatus 102b post processes the oversampled signal in the notch region (which is translated to the higher frequency band), and the oversampled signal to reconstruct the signal of original frequency (i.e., the signal which was oversampled at the transmitter end). In some embodiments, apparatus 102b has similar circuits/logic as apparatus 102a but in reverse order to reconstruct the signal which was pre-processed by apparatus 102a.

Figure 1B:
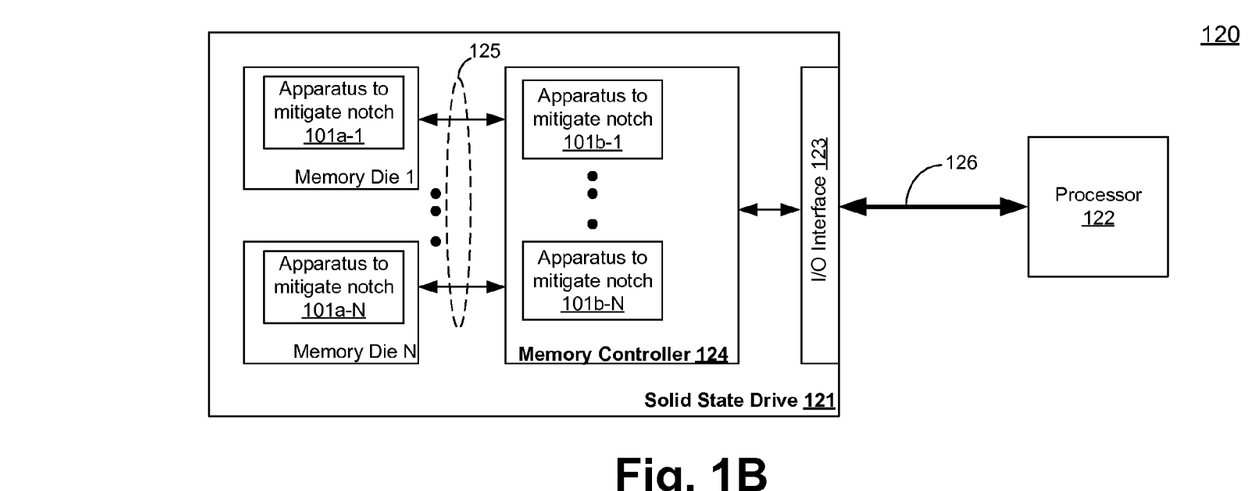
FIG. 1B illustrates a system with a solid state drive (SSD) having an apparatus for mitigating a notch effect in a channel between a memory die and a memory controller, according to some embodiments of the disclosure.

FIG. 1B illustrates system 120 with a Solid State Drive (SSD) having an apparatus for mitigating a notch in a channel between a memory die and a memory controller, according to some embodiments of the disclosure. It is pointed out that those elements of FIG. 1B having the same reference numbers (or names) as the elements of any other figure can operate or function in any manner similar to that described, but are not limited to such.

In some embodiments, system 120 comprises SSD 121 and Processor 122. In some embodiments, SSD 121 includes an Input/Output (I/O) interface 123, Memory Controller 124, and a plurality of memory dies (i.e., Memory Die 1 through Memory Die N, where N is an integer). In some embodiments, I/O interface 123 is a Serial Advanced Technology Attachment (SATA) interface and interconnect 126 is a SATA compliant bus coupling SSD 121 to Processor 122. In other embodiments, other types of I/O interfaces may be used for I/O interface 123. For example, Serial Attached Small Computer System Interface (SCSI) (or simply SAS) may be used for I/O interface 123, and interconnect 126 is a SAS compliant interface; Peripheral Component Interconnect Express (PCIe) may also be used for I/O interface 123 as described by PCIe Base 3.0 Specification.

In some embodiments, Processor 122 is a microprocessor (such as those designed by Intel Corporation of Santa Clara, Calif.), Digital Signal Processors (DSPs), Field-Programmable Gate Arrays (FPGAs), Application Specific Integrated Circuits (ASICs), or Radio-Frequency Integrated Circuits (RFICs), etc. So as not to obscure the embodiments, a simplified version of SSD 121 is shown. A person skilled in the art would appreciate that there are other logic and circuits needed for complete operation of SSD 121. For example, encoders, decoders, syndrome calculators, queues, input-output buffers, etc., are not shown.

While the embodiments of FIG. 1B are illustrated with two distinct components in SSD 121 and Processor 122, in some embodiments, SSD 121 and Processor 122 can be packaged together as a single unit. In some embodiments, SSD 121 and Processor 122 are implemented using a three dimensional integrated circuit (3D IC) technology where various dies are stacked on each other. For example, various dies or components of SSD 121 may be implemented as dies that are stacked on a die of Processor 122 to form a stacked die or 3D IC.

Here, memory dies (i.e., Memory Die 1 to Memory Die N, where 'N' is an integer) are shown as a group of memory banks in one area. In some embodiments, the memory dies may be distributed in SSD 121. In some embodiments, each memory die is a non-volatile memory. For example, each memory die is one or more of a single or multi-threshold level NAND flash memory, NOR flash memory, single or multi-level Phase Change Memory (PCM), a three dimensional cross point memory, a resistive memory, nanowire memory, ferro-electric transistor random access memory (FeTRAM), magnetoresistive random access memory (MRAM) memory that incorporates memristor technology, or spin transfer torque (STT)-MRAM, or a combination of any of the above, etc.

In some embodiments, Memory Controller 124 includes apparatus 101b-1 through 101b-N (where, N is an integer) to pre-process the signal transmitted over channel 125 to memory dies. In some embodiments, channel 125 is an Open NAND Flash Interface (ONFI) specification compliant interface (e.g., ONFI-4 (4.0 revision released Apr. 2, 2014)). An ONFI-4 channel supports data transfer at 800 Mega Transfers per second (MT/s). In other embodiments, other types of interfaces may be used for communicating between Memory Controller 124 and Memory Dies.

In some embodiments, each memory die includes apparatus 101a-1 through 101a-N to post-process the received signal and to mitigate the notch effect manifested by channel 125. While the embodiments are described with reference to Memory Controller 124 transmitting to Memory Dies 1 through N, for example, both transmit and receive logic/circuits are included in both Memory Controller 124 and the memory dies. Each of apparatus 101a-1 through 101a-N performs the same function as apparatus 101a, and each of apparatus 101b-1 through 101b-N performs the same function as apparatus 102a when Memory Controller 124 is the transmitting end and Memory Die is the receiving end. The embodiments are not limited to an SSD, and can be applied to any communication system that uses a channel having a notch.

Figure 2:
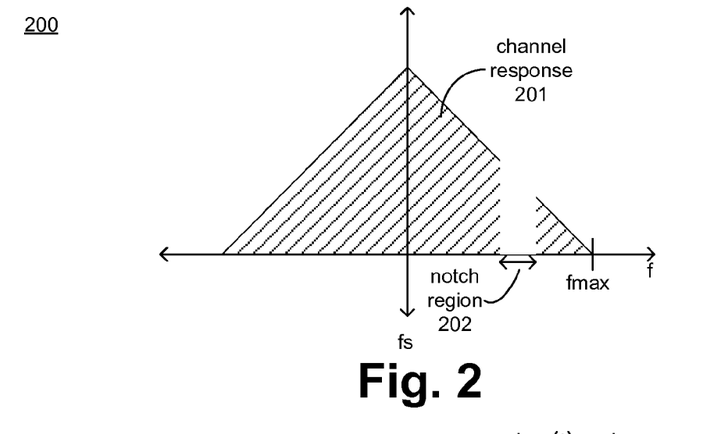
FIG. 2 illustrates a frequency response of a channel exhibiting a notch.

FIG. 2 illustrates frequency response 200 of a channel (e.g., 103/125) exhibiting a notch effect. It is pointed out that those elements of FIG. 2 having the same reference numbers (or names) as the elements of any other figure can operate or function in any manner similar to that described, but are not limited to such.

Here, x-axis is normalized frequency, where fs is the sampling frequency and fmax is the maximum frequency of the channel response. The y-axis depends on the type of signal. Here, y-axis is assumed to be the amplitude of the signal through channel 103/125. Channel response 201 illustrates a notch region 202 where the signal content (at that frequency region) is suppressed (i.e., notched) and so the signal content is lost in that region. Various embodiments of this disclosure mitigate the suppression of the signal content in notch region 202 by filtering those contents before sending the signal over channel 103/125 and placing those filtered contents on a higher frequency band (i.e., greater than fmax) so that the filtered content is not suppressed or impacted by notch region 202.

Figure 3:
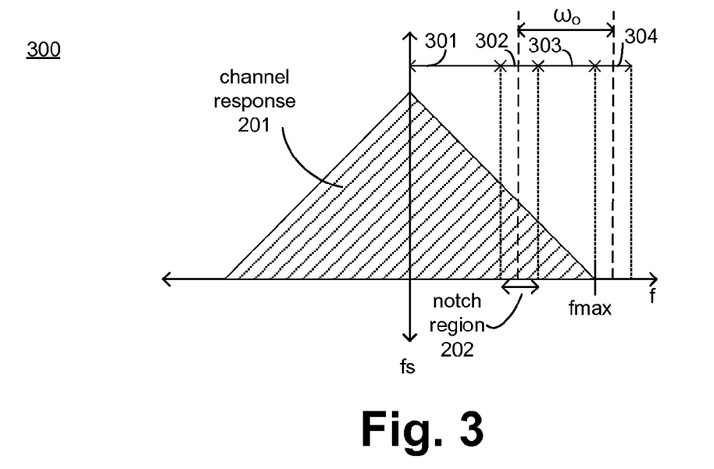
FIG. 3 illustrates a frequency response of a channel assuming no notch, and decomposition of part of the frequency response to mitigate the notch effect, according to some embodiments of the disclosure.

FIG. 3 illustrates frequency response 300 of channel 103/125 assuming no notch, and decomposition of part of the channel frequency response to mitigate the notch effect, according to some embodiments of the disclosure. It is pointed out that those elements of FIG. 3 having the same reference numbers (or names) as the elements of any other figure can operate or function in any manner similar to that described, but are not limited to such.

Here, x-axis is normalized frequency, where fs is the sampling frequency and fmax is the maximum frequency of the response. The y-axis depends on the type of signal. Here, y-axis is assumed to be the amplitude of the signal through channel 103/125. In some embodiments, the frequency band region between fs and the region over fmax is decomposed into sub-bands. So as not to obscure the embodiments, four sub-bands 301, 302, 303, and 304 are shown.

In some embodiments, sub-band 302 is filtered and translated or modulated up to sub-band 304. This allows signal content in notch region 202 to be protected from channel notch because channel notch cannot suppress signals outside the notch region 202. Here, $\omega_o$ is the translation in frequency that is given to the sub-band portion in notch region 202. For example, if center frequency of 5 GHz of the notch is moved to 7 GHz, then $\omega_o$ is 2 GHz×2×Pi. In some embodiments, filter banks are used to decompose the frequency region into sub-bands using finite impulse response filter (FIR). In some embodiments, filter banks use infinite impulse response filters (IIR). In other embodiments, other types of filters may be used.

Figure 4:
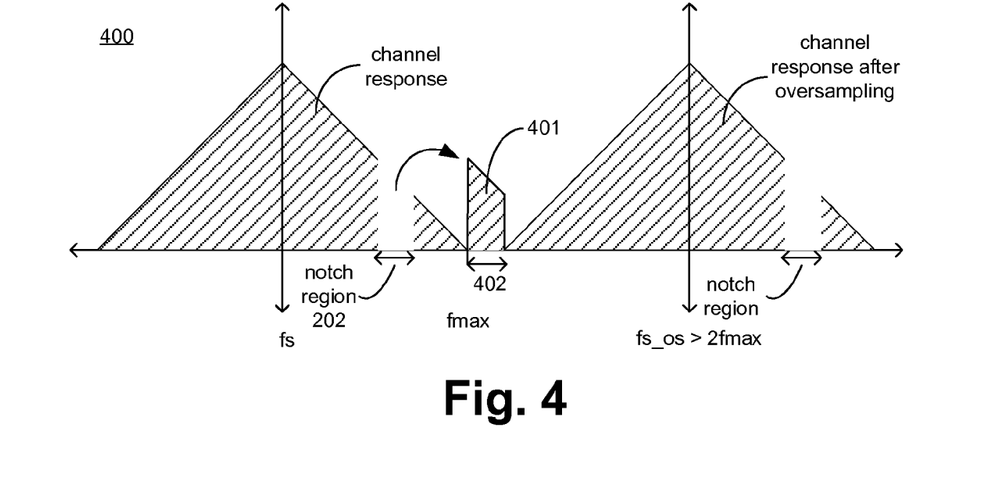
FIG. 4 illustrates a frequency response after oversampling of a signal for transmission and after modulating frequency content in the notch region to a higher frequency band, according to some embodiments of the disclosure.

FIG. 4 illustrates frequency response 400 after oversampling of a signal for transmission and modulating frequency content in notch region 202 to a higher frequency band, according to some embodiments of the disclosure. It is pointed out that those elements of FIG. 4 having the same reference numbers (or names) as the elements of any other figure can operate or function in any manner similar to that described, but are not limited to such.

In some embodiments, the signal for transmission is oversampled to generate a "hole" in the frequency domain in a frequency band higher than fmax. Oversampling is a process of sampling a signal with a sampling frequency significantly higher than the Nyquist rate. One reason for oversampling is that a bandwidth-limited signal can be reconstructed if sampled above the Nyquist rate. The Nyquist rate is twice the highest frequency (i.e., fmax) in the signal. Some technical effects of oversampling are that it improves resolution, reduces noise, and assists with avoiding aliasing and phase distortion by relaxing anti-aliasing filter performance requirements.

Here, the "hole" is the frequency region 402. In some embodiments, a bandpass filter, or filter bank that generates sub-band 302 overlapping the notch region 202, is used to filter out the signal which would otherwise be in notch region 202 (i.e., the filter bank has a passband response at the channel notch). This filtered signal content is signal content 401 which is translated or modulated to the frequency band of hole 402, according to some embodiments. In some embodiments, the oversampled signal and the filtered signal translated to region 402 (which has a frequency band higher than the frequency band of notch region 202) is then combined together and transmitted together over channel 103/125 to a receiver which then reconstructs the original signal.

Figure 5:
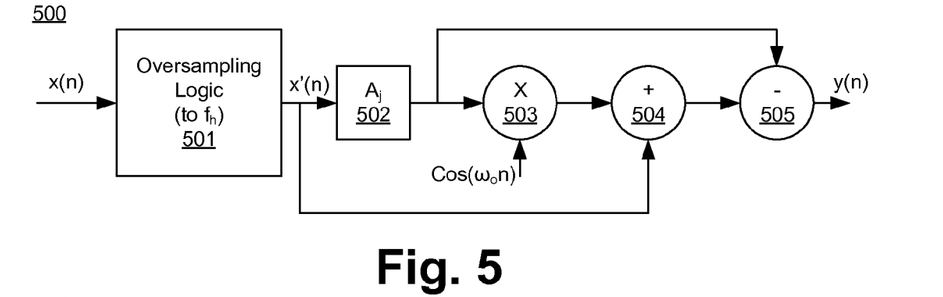
FIG. 5 illustrates an apparatus for mitigating the notch effect at the transmitter end, according to some embodiments of the disclosure.

FIG. 5 illustrates apparatus 500 for mitigating the notch effect at the transmitter end, according to some embodiments of the disclosure. It is pointed out that those elements of FIG. 5 having the same reference numbers (or names) as the elements of any other figure can operate or function in any manner similar to that described, but are not limited to such.

In some embodiments, apparatus 500 comprises Oversampling Logic 501, bandpass filter 502 (with pass band response Aj), modulator 503, and adder/combiner or integrator 504. In some embodiments, input signal samples x(n) are received by Oversampling Logic 501 that oversamples x(n) to a higher frequency ($f_h$) to generate oversampled signal samples x'(n). The process of oversampling by Oversampling Logic 501 generates a frequency hole (i.e., region 402) above fmax. In some embodiments, bandpass filter 502 filters the signal content in notch region 202. Here, bandpass filter 502 has a passband response that passes the signal content in notch region 202 and blocks all other frequency content.

In some embodiments, output of bandpass filter 502 (i.e., the signal content in notch region 202) is translated up or modulated to a higher frequency band (i.e., frequency band 402) by multiplying the filtered signal content with Cosine ($\omega_o$n), where $\omega_o$ is the translation in frequency that is given to the sub-band portion in notch region 202. In some embodiments, the modulated signal (i.e., the output of modulator 503) is then added/combined or integrated with the oversampled signal x'(n) which is then sent to channel 103/125.

In some embodiments, apparatus 500 also includes subtraction logic 505 which subtracts the filtered content from notch region 202. The filtered content is subtracted from notch region 202 because it is duplicated in the high frequency region. Even though the filtered content is distorted by the notch in the channel upon transmission of the signal through the channel, and in some embodiments the filtered content may not be subtracted out, sending two copies of the same data (i.e., the filtered data) may not be ideal in terms of power performance. Samples y(n) are then received by receiver 102a (e.g., one of apparatus 101a-1) which reconstructs the original signal.

Figure 6A:
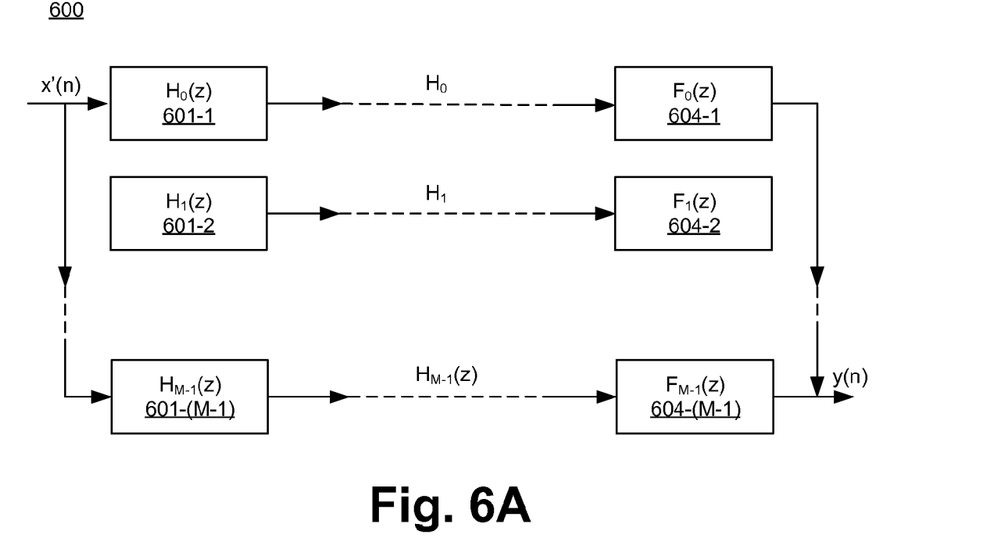
FIG. 6A illustrates a filter bank of the apparatus for decomposing part of the frequency response into sub-bands to mitigate the notch effect, according to some embodiments of the disclosure.

FIG. 6A illustrates filter bank 600 of the apparatus for decomposing part of the frequency response into sub-bands to mitigate the notch effect, according to some embodiments of the disclosure. It is pointed out that those elements of FIG. 6A having the same reference numbers (or names) as the elements of any other figure can operate or function in any manner similar to that described, but are not limited to such.

Filter bank 600 comprises an array of bandpass filters $H_x(z)$, where 'x' ranges from 1 to M−1 (i.e., 601-1 to 601-(M−1)) that separates the input signal x'(s) into multiple components (i.e., sub-bands), each one carrying a single frequency sub-band of the original signal. Here, $H_x(z)$ is the transfer function of filter 'x' and 'M' is an integer. The process of decomposition is performed by 601-1 to 601-(M−1), which are collectively also called analysis (i.e., analysis of the signal in terms of its components in each sub-band). The output of analysis (i.e., output of 601-1 to 601-(M−1)) is referred to as a sub-band signal with as many sub-bands as there are filters in the filter bank. In some embodiments, filter bank 600 performs sub-band decomposition of the oversampled signal x'(n) using FIR or IIR filters.

In some embodiments, filter back 600 comprises bandpass filters $F_x(z)$, where 'x' ranges from 0 to (M−1) (i.e., 604-1 to 604-(M−1)). In some embodiments, bandpass filters are tuned to have a passband response in notch region 202. In some embodiments, additional up samplers (not shown) and down samplers (not shown) are added between filters $H_x(z)$ and $F_z(z)$.

Figure 6B:
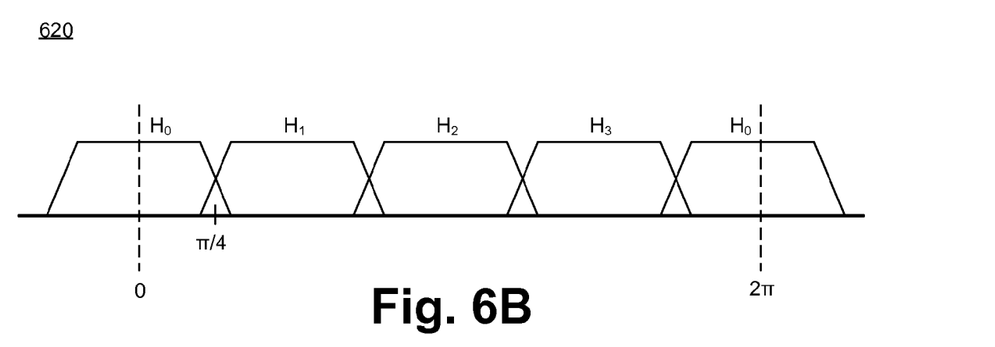
FIG. 6B illustrates a waveform showing operation of the filter bank of the apparatus, according to some embodiments of the disclosure.

Here, filter bank 600 is an M-channel uniform filter bank. In this example, M=4. In some embodiments, oversampled signal x'(n) is decomposed into four uniform frequency bands (or sub-bands). Though there may be aliasing at the output of the decimators as shown by waveform 600 of FIG. 6B, the reconstruction filters at the receiver ensure that the aliasing in the reconstructed signal is cancelled, according to some embodiments.

Figure 7:
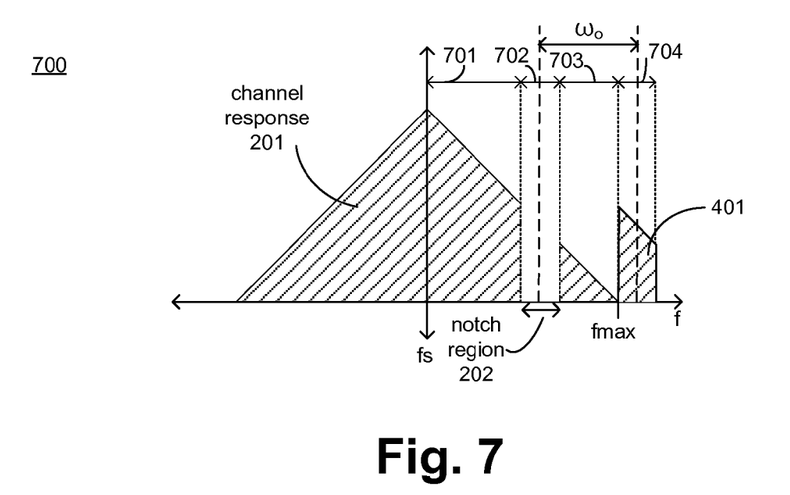
FIG. 7 illustrates a frequency response of the channel at the receiver end, according to some embodiments of the disclosure.

FIG. 7 illustrates frequency response 700 of channel 103/125 at the receiver end showing the oversampled signal and the modulated frequency content transmitted by the transmitter, according to some embodiments of the disclosure. It is pointed out that those elements of FIG. 7 having the same reference numbers (or names) as the elements of any other figure can operate or function in any manner similar to that described, but are not limited to such.

Here, receiver 101b receives the oversampled signal and the filtered signal 401 which was modulated to region 402. In some embodiments, receiver 101b implements a filter bank that reconstructs sub-bands 701, 702, 703, and 703 (corresponding to sub-bands 301, 302, 303, and 304) and translates the high frequency band 402 (i.e., 702) back to its lower frequency in notch region 202. In some embodiments, the lower frequency signal content is combined with the oversampled signal to generate a combined signal using a reconstruction filter bank.

Figure 8:
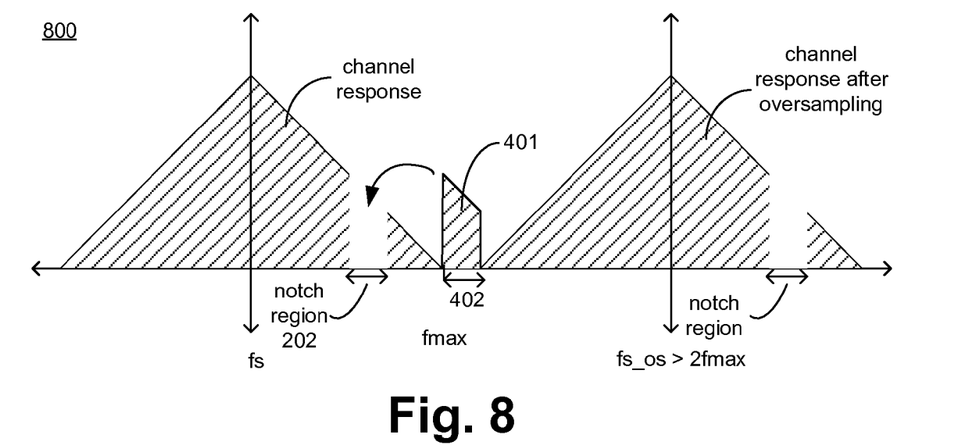
FIG. 8 illustrates a frequency response of the channel at the receiver end, according to some embodiments of the disclosure.

FIG. 8 illustrates frequency response 800 of channel 103/125 at the receiver end showing modulation of frequency content (in the higher frequency band) to the notch region at a lower frequency band, according to some embodiments of the disclosure. It is pointed out that those elements of FIG. 8 having the same reference numbers (or names) as the elements of any other figure can operate or function in any manner similar to that described, but are not limited to such.

FIG. 8 is like FIG. 4 except that it is from the point of view of the receiver. In some embodiments, the higher frequency band content 401 in frequency band 402, which would otherwise be in notch region 202, is filtered using a bandpass filter or a filter bank and then translated down or modulated to a lower frequency band which is the frequency band of the notch.

Figure 9:
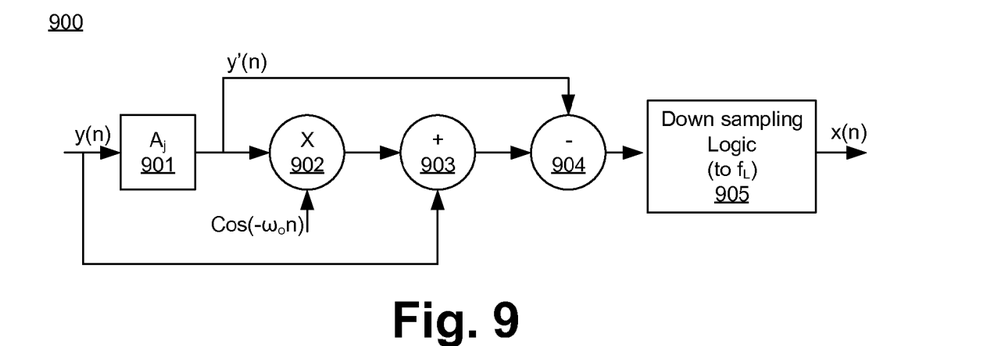
FIG. 9 illustrates an apparatus for mitigating the notch effect at the receiver end, according to some embodiments of the disclosure.

FIG. 9 illustrates apparatus 900 for mitigating the notch effect at the receiver end, according to some embodiments of the disclosure. It is pointed out that those elements of FIG. 9 having the same reference numbers (or names) as the elements of any other figure can operate or function in any manner similar to that described, but are not limited to such.

In some embodiments, apparatus 900 comprises bandpass filter 901, modulator 902, adder/combiner or integrator 903, subtraction logic 904, and Down sampling Logic 905. In some embodiments, receiver 101b receives input samples y(n) which includes the oversampled signal samples as well as the signal content 401 in higher frequency band 402. In some embodiments, bandpass filter 901 has a passband response (Aj) such that it filters the high frequency band region 402 as y'(n).

In some embodiments, the filtered signal samples y'(n) are then modulated down by modulator 902 by multiplying y'(n) with Cosine $(-\omega_o n)$ so that the filtered signal content is translated in frequency domain from frequency band 402 to frequency band 202. In some embodiments, the modulated signal (i.e., output of modulator 902) is then combined with the input signal y(n) (i.e., the oversampled signal and the high frequency content signal 401). In some embodiments, the high frequency signal content 401 is then removed or subtracted out from the resultant signal (i.e., from the output of combiner 903) to reconstruct the signal content that was originally oversampled at the transmitter end (e.g., 101a). In some embodiments, Down sampling Logic 905 down samples the reconstructed signal content back to its original frequency (i.e., $f_L$) to generate an output signal x(n). This output signal x(n) retains its fidelity despite channel 103/125 having a notch.

Figure 10:
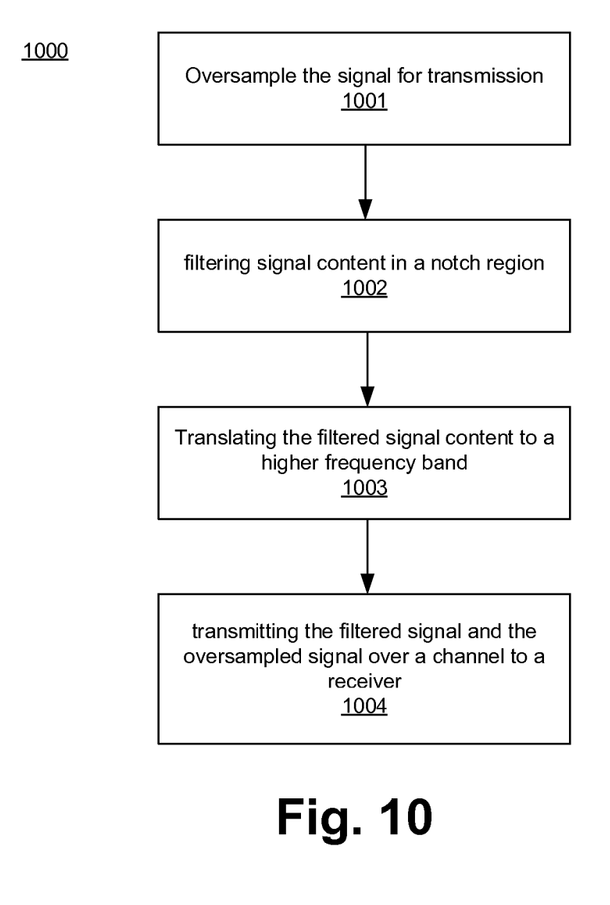
FIG. 10 illustrates a flowchart of a method for mitigating the notch effect at the transmitter end, according to some embodiments of the disclosure.

FIG. 10 illustrates flowchart 1000 of a method for mitigating the notch effect at the transmitter end, according to some embodiments of the disclosure. It is pointed out that those elements of FIG. 10 having the same reference numbers (or names) as the elements of any other figure can operate or function in any manner similar to that described, but are not limited to such.

Although the blocks in the flowchart with reference to FIG. 10 are shown in a particular order, the order of the actions can be modified. Thus, the illustrated embodiments can be performed in a different order, and some actions/blocks may be performed in parallel. Some of the blocks and/or operations listed in FIG. 10 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 1001, a signal for transmission is oversampled by Oversampling Logic 501. This process generates a "hole" at a frequency band higher than the maximum frequency of the channel response. This hole (which is a frequency band) is then used to carry the signal content that would otherwise be lost in the channel notch. At block 1002, bandpass filter 502 filters the signal content in notch region 202 to preserve that signal before it is lost in the channel notch. At block 1003, modulator 503 translates the filtered signal content 401 to a higher frequency band 402 (which is a "hole" region above fmax). The filtered signal content 401 is then combined with the oversampled signal. At block 1004, the combined signal (i.e., the filtered signal 401 and the oversampled signal) are transmitted by a driver over channel 103/125 to a receiver.

Figure 11:
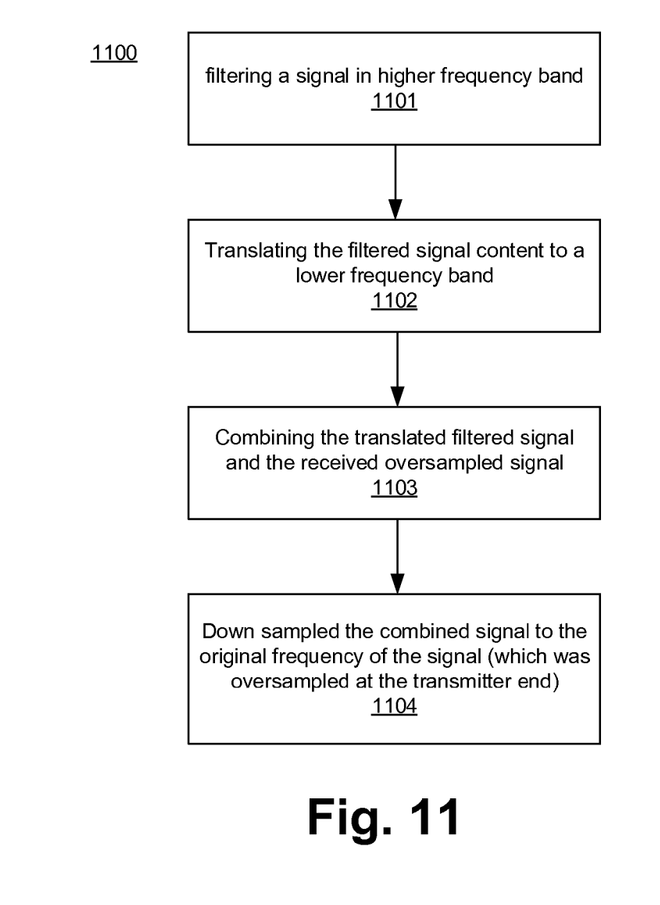
FIG. 11 illustrates a flowchart of a method for mitigating the notch effect at the receiver end, according to some embodiments of the disclosure.

FIG. 11 illustrates flowchart 1100 of a method for mitigating the notch effect at the receiver end, according to some embodiments of the disclosure. It is pointed out that those elements of FIG. 11 having the same reference numbers (or names) as the elements of any other figure can operate or function in any manner similar to that described, but are not limited to such.

Although the blocks in the flowchart with reference to FIG. 11 are shown in a particular order, the order of the actions can be modified. Thus, the illustrated embodiments can be performed in a different order, and some actions/blocks may be performed in parallel. Some of the blocks and/or operations listed in FIG. 11 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 1101, signal content in the higher frequency band 402 is filtered by bandpass filter 901. The passband response of filter 901 is different than the passband response of filter 501. For example, passband response of filter 901 filters a higher frequency content (i.e., region 402) than the passband response of filter 501 (which filters notch region 202). At block 1102, the filtered signal content in region 402 is translated down by modulator 702 to a lower frequency band 202 (which is the frequency region of the notch).

At block 1103, adder 902 combines the filtered content, now translated to a lower frequency band, with the oversampled signal received by receiver 101*b*. At block 1104, the high frequency signal content 401 is filtered out (i.e., subtracted from the overall signal) to reconstruct the original signal that was oversampled at transmitter 101*a*. At block 1105, the combined signal (minus the high frequency signal content) is down sampled to a lower frequency (i.e., the original frequency of the signal before it was oversampled at the transmitting end) by Down sampling Logic 704 to generate the recovered signal.

Figure 12:
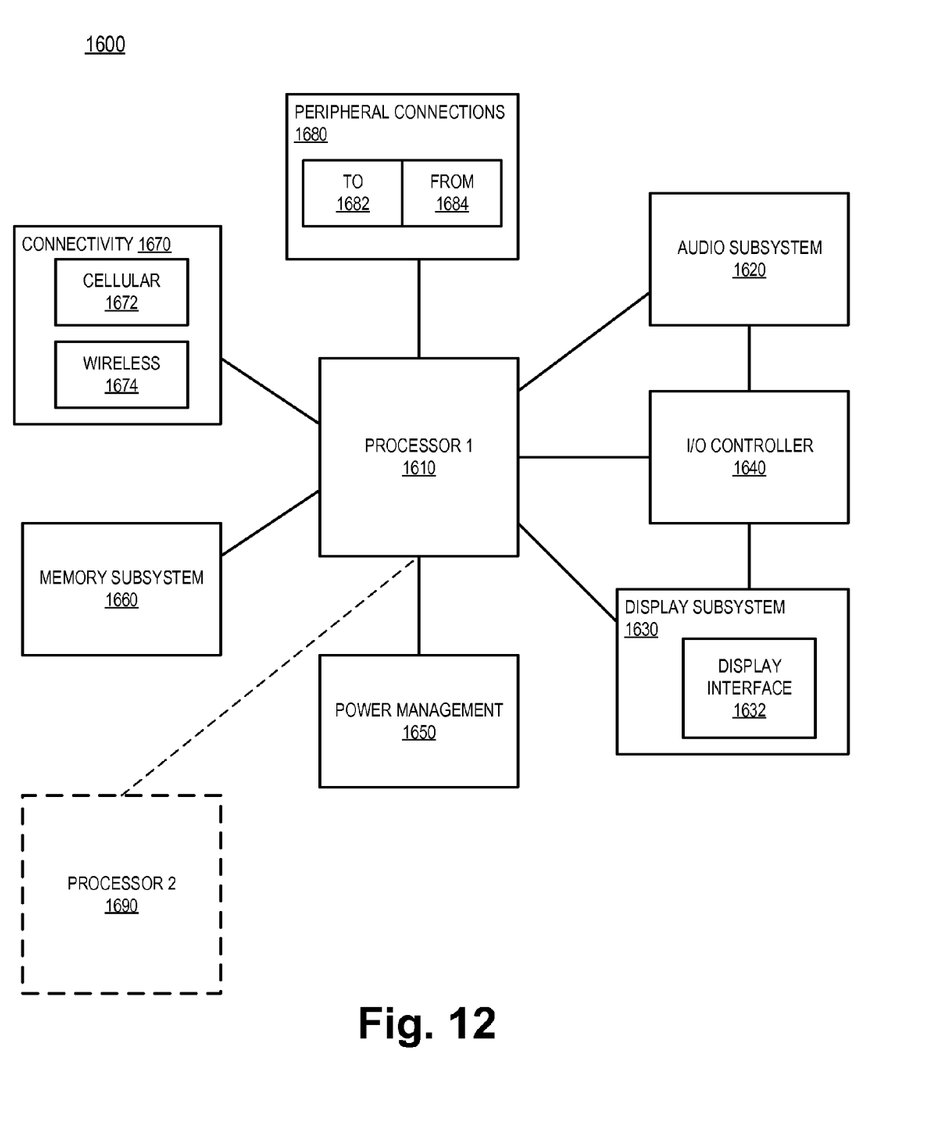
FIG. 12 illustrates a smart device or a computer system or a SoC (System-on-Chip) with apparatus for mitigating the notch effect, according to some embodiments.

FIG. 12 illustrates a smart device or a computer system or a SoC (System-on-Chip) with apparatus for mitigating the notch effect, according to some embodiments. FIG. 12 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 with apparatus for mitigating the notch effect, according to some embodiments discussed. Other blocks of the computing device 1600 may also include an apparatus for mitigating the notch effect according to some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 comprises connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device 1600 comprises peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a first sampler to oversample a signal, the signal being processed for transmission through a channel having a notch region; a bandpass filter with passband response to filter the oversampled signal in the notch region; and a first modulator to translate the filtered signal to a higher frequency band than a frequency band of the notch region. In some embodiments, the bandpass filter is implemented as a filter bank. In some embodiments, the filter bank decomposes the oversampled signal into multiple sub-band sections, and wherein the filtered signal is one of the decomposed signals in one of the sub-band sections. In some embodiments, the apparatus comprises a transmitter to transmit the translated filtered signal and the oversampled signal through the channel to a receiver, wherein the channel has a notch associated with the notch region.

In some embodiments, the receiver comprises a second modulator to modulate the translated filtered signal, received by the receiver, to a lower frequency band, wherein the lower frequency band is the frequency band of the notch region. In some embodiments, the receiver comprises a reconstruction filter bank to combine the modulated filtered signal, generated by the second modulator, with the received oversampled signal which suffered notch degradation. In some embodiments, the receiver comprises a down sampler to restore the oversampled signal to a frequency of the signal sampled by the first sampler.

In another example, a method is provided which is performed by a transmitter. The method comprises: oversampling a signal; and translating, in response to the oversampling, signal content in a notch region of a channel to a frequency band which is higher than a frequency band of the notch region. In some embodiments, the method comprises: transmitting the oversampled signal and the translated signal content over the channel to a receiver. In some embodiments, the receiver is to modulate the translated signal content from the higher frequency band to a lower frequency band corresponding to the frequency band of the notch region. In some embodiments, the receiver combines the translated signal content, which is modulated to the lower frequency band, with the received oversampled signal which suffered notch degradation.

In another example, a system is provided which comprises: a channel having a notch region; a first Integrated Circuit (IC); and a second IC coupled to the first IC via the channel, the second IC including a transmitter which comprises: a first sampler to oversample a signal, the signal being processed for transmission through the channel; a bandpass filter with passband response to filter the oversampled signal in the notch region of the channel; a first modulator to translate the filtered signal to a higher frequency band than a frequency band of the notch region; and a driver to transmit the translated filtered signal and the oversampled signal to the first IC.

In some embodiments, the system comprises an I/O interface for communicating with another processor. In some embodiments, the I/O interface is a SATA interface. In some embodiments, the first IC is a memory controller and the second IC is a non-volatile memory. In some embodiments, the non-volatile memory is at least one of: NAND flash memory, NOR flash memory, a PCM, a three dimensional cross point memory, a resistive memory, nanowire memory, a FeTRAM, a MRAM memory that incorporates memristor technology, or a STT-MRAM.

In some embodiments, the first IC is a non-volatile memory and the second IC is a memory controller. In some embodiments, the non-volatile memory is at least one of: NAND flash memory, NOR flash memory, a PCM, a three dimensional cross point memory, a resistive memory, nanowire memory, a FeTRAM, a MRAM memory that incorporates memristor technology, or a STT-MRAM. In some embodiments, the channel is an ONFI compliant channel. In some embodiments, the system comprises a wireless interface for allowing the first or second IC to wirelessly communicate with another device.

In another example, an apparatus is provided which comprises means for oversampling a signal; and means for translating, in response to oversampling, signal content in a notch region of a channel to a frequency band which is higher than a frequency band of the notch region. In some embodiments, the apparatus comprises: means for transmitting the oversampled signal and the translated signal content over the channel to a receiver. In some embodiments, the receiver is to modulate the translated signal content from the higher frequency band to a lower frequency band corresponding to the frequency band of the notch region. In some embodiments, the receiver to combine the translated signal content, which is modulated to the lower frequency band, with the received oversampled signal which suffered notch degradation.

In another example, an apparatus is provided which comprise a receiver to receive, an oversampled signal, over a channel having a notch region; a bandpass filter with passband response to filter the oversampled signal in the notch region; and a modulator to translate the filtered signal to a lower frequency band than a frequency band of the oversampled signal. In some embodiments, the bandpass filter is implemented as a filter bank. In some embodiments, the filter bank to reconstruct a signal from multiple sub-band sections, and wherein the filtered signal is one of the reconstructed signals in one of the sub-band sections. In some embodiments, the receiver is to modulate the translated signal content from the higher frequency band to the lower frequency band corresponding to a frequency band of the notch region.

In some embodiments, the receiver combines the translated signal content, which is modulated to the lower frequency band, with the received oversampled signal which suffered notch degradation. In some embodiments, the receiver comprises a down sampler to restore the oversampled signal to a frequency of a signal sampled by a sampler of a transmitter.

In another example, a system is provided which comprises: a channel having a notch region; a first IC; and a second IC coupled to the first IC via the channel, the first IC including a receiver which comprises and apparatus according to the apparatus described above. In some embodiments, the system comprises an I/O interface for communicating with another processor. In some embodiments, the non-volatile memory is at least one of: NAND flash memory, NOR flash memory, a PCM, a three dimensional cross point memory, a resistive memory, nanowire memory, a FeTRAM, a MRAM memory that incorporates memristor technology, or a STT-MRAM.

In some embodiments, the first IC is a non-volatile memory and the second IC is a memory controller. In some embodiments, the non-volatile memory is at least one of: NAND flash memory, NOR flash memory, a PCM, a three dimensional cross point memory, a resistive memory, nanowire memory, a FeTRAM, a MRAM memory that incorporates memristor technology, or a STT-MRAM. In some embodiments, the channel is an ONFI compliant channel. In some embodiments, the system comprises a wireless interface for allowing the first or second IC to wirelessly communicate with another device.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. An apparatus comprising:
   a first sampler to oversample a signal, the signal to be processed for transmission through a channel having a notch region;
   a bandpass filter, with passband response, to filter the oversampled signal in the notch region; and
   a first modulator to translate the filtered signal to a higher frequency band than a frequency band of the notch region.

2. The apparatus of claim 1, wherein the bandpass filter is implemented as a filter bank.

3. The apparatus of claim 2, wherein the filter bank is to decompose the oversampled signal into multiple sub-band sections, and wherein the filtered signal is one of the decomposed signals in one of the sub-band sections.

4. The apparatus of claim 1 comprises a transmitter to transmit the translated filtered signal and the oversampled signal through the channel to a receiver, wherein the channel has a notch associated with the notch region.

5. The apparatus of claim 4, wherein the receiver comprises a second modulator to modulate the translated filtered signal, received by the receiver, to a lower frequency band, wherein the lower frequency band is the frequency band of the notch region.

6. The apparatus of claim 5, wherein the receiver comprises a reconstruction filter bank to combine the modulated filtered signal, generated by the second modulator, with the received oversampled signal which suffered notch degradation.

7. The apparatus of claim 6, wherein the receiver comprises a down sampler to restore the oversampled signal to a frequency of the signal sampled by the first sampler.

8. A method performed by a transmitter, the method comprising:
   oversampling a signal; and
   translating, in response to the oversampling, at least a portion of the oversampled signal content in a notch region of a wired channel to a frequency band which is higher than a frequency band of the notch region.

9. The method of claim 8 comprising:
   transmitting the oversampled signal and the translated signal content over the wired channel to a receiver.

10. The method of claim 9, wherein the receiver is to modulate the translated signal content from the higher frequency band to a lower frequency band corresponding to the frequency band of the notch region.

11. The method of claim 10, wherein the receiver is to combine the translated signal content, which is modulated to the lower frequency band, with the received oversampled signal which suffered notch degradation.

12. A system comprising:
   a channel having a notch region;
   a first Integrated Circuit (IC); and
   a second IC coupled to the first IC via the channel, the second IC including a transmitter which comprises:
   a first sampler to oversample a signal, the signal to be processed for transmission through the channel;
   a bandpass filter, with passband response, to filter the oversampled signal in the notch region of the channel;
   a first modulator to translate the filtered signal to a higher frequency band than a frequency band of the notch region; and
   a driver to transmit the translated filtered signal and the oversampled signal to the first IC.

13. The system of claim 12 comprises an I/O interface which is to allow communication with another processor.

14. The system of claim 13, wherein the I/O interface is a Serial Advanced Technology Attachment (SATA) interface.

15. The system of claim 12, wherein the first IC is a memory controller and the second IC is a non-volatile memory.

16. The system of claim 15, wherein the non-volatile memory is at least one of:
   NAND flash memory,
   NOR flash memory,
   a Phase Change Memory (PCM),
   a three dimensional cross point memory,
   a resistive memory, nanowire memory,
   a ferro-electric transistor random access memory (Fe-TRAM),
   a magnetoresistive random access memory (MRAM) memory that incorporates memristor technology, or
   a spin transfer torque (STT)-MRAM.

17. The system of claim 12, wherein the first IC is a non-volatile memory and the second IC is a memory controller.

18. The system of claim 17, wherein the non-volatile memory is at least one of:
   a NAND flash memory,
   a NOR flash memory,
   a Phase Change Memory (PCM),
   a three dimensional cross point memory,
   a resistive memory, nanowire memory,
   a ferro-electric transistor random access memory (Fe-TRAM),
   a magnetoresistive random access memory (MRAM) memory that incorporates memristor technology, or
   a spin transfer torque (STT)-MRAM.

19. The system of claim 12, wherein the channel is an Open NAND Flash Interface (ONFI) compliant channel.

20. The system of claim 12 comprises a wireless interface which is to allow the first or second IC to wirelessly communicate with another device.

21. An apparatus comprising:
   a filter to receive a signal on a first frequency band over a channel having a notch region, and to provide a filtered signal; and
   a modulator coupled to the filter, the modulator is to modulate the filtered signal to a second frequency band, where the second frequency band is lower in frequency than the first frequency band, and where the second frequency band is a frequency band of the notch region of the channel.

22. The apparatus of claim 21 comprises a reconstruction filter bank to combine the modulated filtered signal with the received signal, the reconstruction filter bank to generate a reconstructed signal.

23. The apparatus of claim 22 comprises a down sampler to down sample the reconstructed signal to restore the received signal to a frequency of a signal sampled by a sampler of a transmitter.

24. The apparatus of claim 21, wherein the filter has a passband response.

* * * * *